(12) United States Patent  
Ma

(10) Patent No.: US 7,861,734 B2
(45) Date of Patent: Jan. 4, 2011

(54) UMBRELLA HUB WITH CORD LOCK FEATURE

(75) Inventor: Oliver Joen-an Ma, 29 W. Wisteria Ave., Arcadia, CA (US) 91007

(73) Assignee: Oliver Joen-an Ma, Arcadia, CA (US)

( * ) Notice: Subject to any disclaimer, the term of this patent is extended or adjusted under 35 U.S.C. 154(b) by 0 days.

(21) Appl. No.: 12/353,128

(22) Filed: Jan. 13, 2009

(65) Prior Publication Data

US 2010/0175732 A1    Jul. 15, 2010

(51) Int. Cl.
*A45B 25/06* (2006.01)
(52) U.S. Cl. .......................... 135/28; 135/38
(58) Field of Classification Search .................. 135/28, 135/37, 38
See application file for complete search history.

(56) References Cited

U.S. PATENT DOCUMENTS

| | | | |
|---|---|---|---|
| 2,743,696 A | 5/1956 | Maxwell | |
| 2,745,421 A | 5/1956 | Russell | |
| 2,786,551 A | 3/1957 | Bennett | |
| 2,867,875 A | 1/1959 | Davison | |
| 3,708,967 A | 1/1973 | Geist et al. | |
| 4,606,366 A | 8/1986 | Collet | |
| D320,111 S * | 9/1991 | Ma | D3/10 |
| 6,253,823 B1 | 7/2001 | Swopes | |
| 6,386,214 B1 | 5/2002 | Clarke | |
| 6,802,329 B2 | 10/2004 | Chen | |
| 6,889,699 B2 | 5/2005 | Clarke | |
| 7,293,573 B2 | 11/2007 | Clarke | |
| 2002/0046761 A1* | 4/2002 | Liang | 135/16 |
| 2003/0178050 A1 | 9/2003 | Wu | |
| 2004/0177871 A1 | 9/2004 | Harbaugh | |
| 2007/0062565 A1 | 3/2007 | Clarke | |

FOREIGN PATENT DOCUMENTS

| | | |
|---|---|---|
| EP | 0628264 | 12/1994 |
| EP | 0829598 | 3/1998 |
| GB | 2299366 | 10/1996 |

OTHER PUBLICATIONS

Partial European Search Report received in corresponding European Application No. EP 10 25 0052, Dated Mar. 22, 2010, 6 pages.

* cited by examiner

*Primary Examiner*—David Dunn
*Assistant Examiner*—Danielle Jackson
(74) *Attorney, Agent, or Firm*—Knobbe Martens Olson & Bear, LLP

(57) ABSTRACT

An umbrella hub is provided that is operative to engage an umbrella cord for maintaining an umbrella in an open position. The hub can comprise a hub body, a channel, a passage section, and an engagement section. The hub body can comprise a series of projections extending outwardly from the hub body. The channel can be formed in one of the projections of the hub body. The channel can be configured to allow the cord to pass therethrough. Further, the passage section can be configured to allow the cord to pass freely therethrough. Finally, the engagement section can be configured to engage the cord to prevent upward movement of the cord relative to the hub body.

31 Claims, 14 Drawing Sheets

UMBRELLA HUB WITH CORD LOCK FEATURE

BACKGROUND

1. Field of the Inventions

The present inventions relate generally to shade structures and devices that can be used to maintain a shade structure in an open position. More specifically, the present inventions relate generally to an umbrella hub that comprises a cord retention device for engaging an umbrella cord to maintain tension in the cord for maintaining an umbrella in an open position.

2. Description of the Related Art

The use of umbrella shade structures generally requires that a canopy member be opened to provide shade over a given area. In many of these structures, the canopy may be attached to a moveable assembly of the structure. When the assembly is moved from a closed to an open position, the canopy can be deployed to thereby provide shade. Likewise, the canopy can be stowed when the assembly is retracted to the closed position.

Umbrellas provide a relatively simply moveable assembly that is coupled with a canopy. The movable assembly is attached to a center pole and, in some cases, will have a sliding component that moves along the pole to allow the assembly to be moved between open and closed positions. When the assembly is moved to the open position, the weight of the canopy and the assembly itself can exert a closing force on the assembly that urges the assembly towards the closed position.

In order to counteract the closing force on the umbrella, the umbrella may incorporate one or more structures or means to maintain the assembly and the canopy in the open position. For example, a latch or pin can be used to limit the movement of the sliding component relative to the umbrella pole. In this manner, the assembly and the canopy can be secured against closing to maintain the umbrella in an open position.

SUMMARY

An aspect of at least one of the embodiments disclosed herein is the realization that the connection devices used in the assembly of shade structures, such as pavilions and outdoor umbrellas, can be improved to provide a more secure, quicker, and more reliable connection. Such devices can use fewer parts and be easier to manufacture than those devices of the prior art. Such improved connections can be particularly advantageous for large shade structures which can sometimes be unwieldy.

In an embodiment, an umbrella hub is provided that comprises a hub body, an aperture, a passage section, and an engagement section. The hub body can comprise a series of projections extending outwardly from the hub body. The aperture can be formed in one of the projections of the hub body. The aperture can be configured to allow a cord to pass therethrough. The passage section can be configured to allow the cord to pass freely therethrough. The engagement section can be configured to engage the cord to prevent upward movement of the cord relative to the hub body.

In some implementations, the passage section and the engagement section can be disposed in the aperture. In others, the aperture can comprise a plurality of raised protrusions for engaging the cord. In yet others, the aperture can also comprise a rotatable gear member for engaging the cord to allow downward movement of the cord relative to the hub and to prevent upward movement of the cord relative to the hub.

Furthermore, in other implementations, the passage section and the engagement section can be formed in a cord retention device attached to an outer surface of the hub, the cord retention device being aligned with the aperture of the projection.

In accordance with an embodiment, an umbrella hub is provided that comprises a central portion, a body, and a cord retention device. The central portion can be configured to receive to an umbrella pole. The body can extend between the central portion and an outer periphery of the hub. The body can comprise a top surface, a bottom surface and an engagement section adjacent to the outer periphery. The engagement section can be configured to receive an end portion of an umbrella structural member. Further, the cord retention device can be formed in the body of the hub. The cord retention device can comprise an aperture extending through the body from the top surface thereof to the bottom surface thereof. The aperture can have a first section and a second section. The first section can be configured such that when a cord extends therethrough, the cord can move freely in both a first direction from the top surface toward the bottom surface and a second direction from the bottom surface toward the top surface. The second section can be configured such that when the cord extends therethrough, the cord can move freely in the first direction while being constrained from movement in the second direction. The cord retention device can thereby allow the cord to be selectively pulled through the aperture to a selected position relative to the hub and retained at the selected position.

In some implementations, the second section of the aperture can comprise a slot having a narrow portion and a wide portion. The narrow portion of the slot can extend transversely relative to a longitudinal axis of the umbrella hub. Further, a first end of the narrow portion of the slot can be disposed adjacent to the first section of the aperture and the narrowed portion of the slot can extend upwardly toward a second end of the narrow portion. Moreover, the narrow portion of the slot can comprise one or more ridges.

In yet other implementations, the cord retention device can be monolithically formed with the body of the hub. The cord retention device can be formed in the body of the hub radially intermediate the central portion and the engagement section. The second section of the aperture can comprise a rotatable member. The rotatable member can be configured to rotate in a first rotational direction in order to allow the cord to move in the first direction, but to engage the cord to prevent movement of the cord in the second direction. In this regard, the rotatable member can comprise one or more teeth. The rotatable number can also be cylindrically shaped. The rotatable member can be a cam.

In yet other embodiments, the aperture of the cord retention device can extend generally parallel to a longitudinal axis of the central portion of the hub. Further, the first section and the second section can extend generally parallel relative to each other and relative to the longitudinal axis of the central portion of the hub.

In accordance with another embodiment, there is provided an umbrella hub that can comprise a central portion, a body, an aperture, and a cord retention device. The central portion can be configured to receive an umbrella pole. The body can extend between the central portion and an outer periphery of the hub. The body can comprise a top surface, a bottom surface and an engagement section adjacent to the outer periphery. Further, the engagement section can be configured to receive an end portion of an umbrella structural member. Also, the aperture can extend through the body from the top surface thereof to the bottom surface thereof generally parallel to a longitudinal axis of the central portion and can comprise a plurality of flexible teeth pointing radially inwardly toward a cord center. The cord retention device can further comprise a gap formed adjacent to the plurality of teeth. The gap can be generally longitudinally aligned with the aperture of the hub. The gap can be configured to allow movement of a cord in both a first direction from the top surface toward the bottom surface and a second direction from the bottom surface toward the top surface. The plurality of teeth can be configured to allow the cord to be passable into the cord center for allowing movement of the cord through a central hole, which can be adjacent ends of the teeth, in the first direction, but to engage the cord to prevent movement in the second direction.

In some implementations, the plurality of teeth formed in the aperture of the cord retention device can extend along a non-horizontal direction. Further, the plurality of teeth can be oriented in a circular pattern. The plurality of teeth can be fixed at first ends and can be oriented radially to second ends that are free ends. In one embodiment, the fixed ends are spaced about a circular perimeter of a body of a cord retention device and oriented radially inwardly to a central portion where the cord may be operated, as discussed herein. It is contemplated that the cord retention device can be attached to the body of the hub. The cord retention device can comprise a circular body. In addition, the circular body of the cord retention device can define a continuous perimeter for circumferentially surrounding the cord when the cord is disposed therethrough. Further, the central portion of the cord retention device can be longitudinally aligned with the aperture of the body of the hub.

In accordance with another embodiment, an umbrella is provided that can comprise an umbrella pole, a first umbrella hub, a cord, a second umbrella hub, and a cord retention device. The first umbrella hub can comprise a central portion configured to receive the umbrella pole. The cord can be connected to the first umbrella hub. Further, the second umbrella hub can comprise a central portion configured to receive the umbrella pole and a body extending between the central portion and an outer periphery of the hub. The body can comprise a top surface, a bottom surface, and an engagement section adjacent to the outer periphery. Further, the cord retention device can be disposed on the body of the second umbrella hub and can comprise an aperture that extends through the body of the second umbrella hub from the top surface to the bottom surface thereof. In this regard, the cord can move freely through the aperture of the cord retention device in a first direction while being restrained from movement in a second direction such that the cord retention device thereby allows the cord to be pulled through the aperture to a selected position relative to the second umbrella hub and retained at the selected position for preventing movement of the first umbrella hub relative to the second umbrella hub.

In some implementations, the aperture of the cord retention device can comprise a first section and a second section. The second section can comprise a slot having a narrow portion and a wide portion. The narrow portion can be configured to restrain movement of the cord in the second direction. The narrow portion of the slot can extend transversely relative to a longitudinal axis of the umbrella hub. Further, a first end of the narrow portion of the slot can be disposed adjacent to the first section of the aperture and the narrowed portion of the slot can extend upwardly toward a second end of the narrow portion. The narrow portion of the slot can comprise one or more ridges. In some embodiments, ridges are provided to enhance the gripping of the cord when the cord is disposed in the narrow portion of the slot.

It is contemplated that the second section of the aperture can comprise a rotatable member. The rotatable member can be configured to rotate in a first rotational direction in order to allow the cord to move in the first direction, but to engage the cord to prevent movement of the cord in the second direction. The rotatable member can be a cylindrical wheel comprising one or more teeth. The rotatable member can also be a cam-shaped member. Furthermore, the hub can be configured such that the first section and the second section can extend generally parallel relative to each other and relative to the longitudinal axis of the central portion of the hub.

BRIEF DESCRIPTION OF THE DRAWINGS

The above-mentioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION

Figure 1:
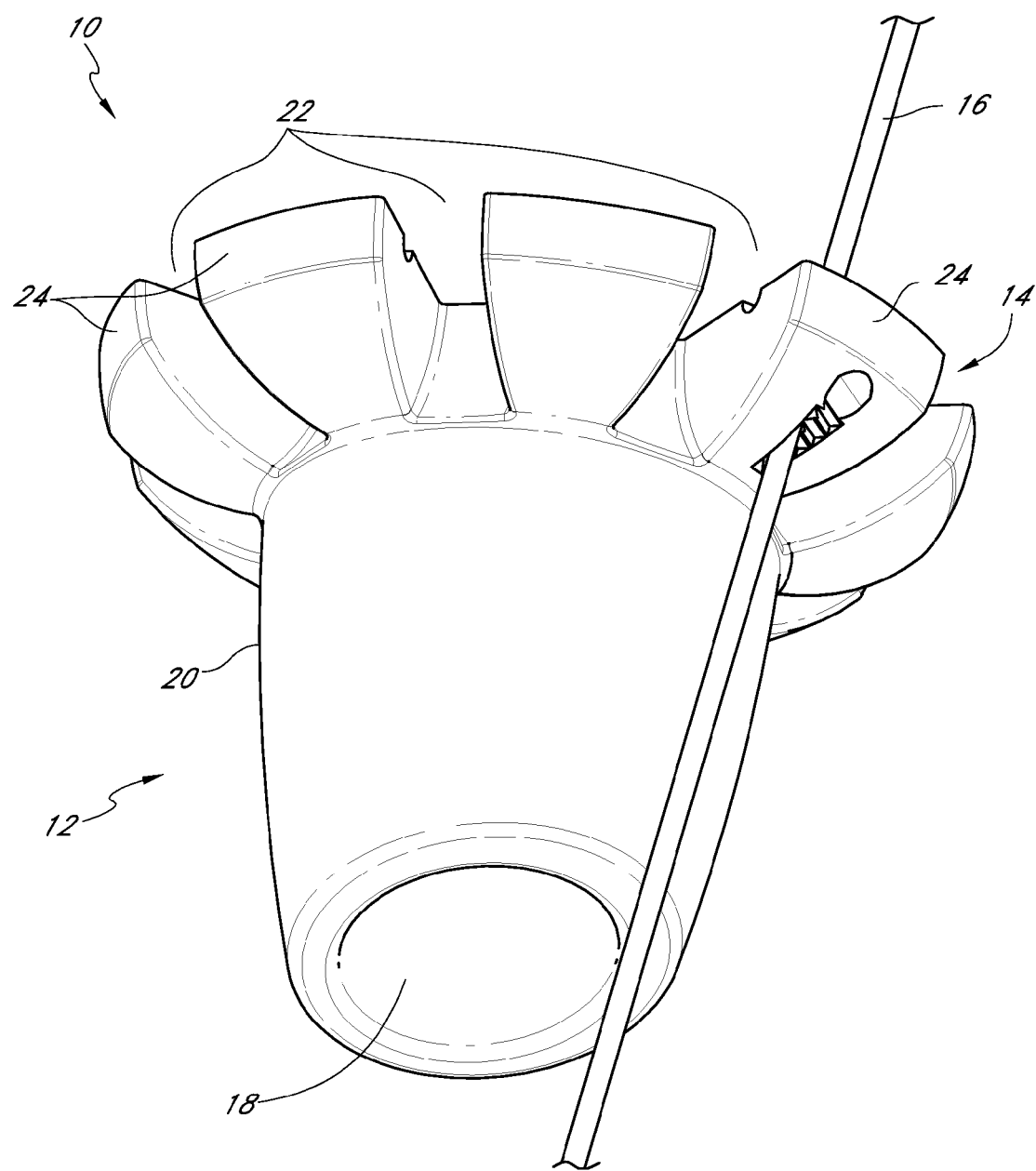
FIG. 1 is a bottom perspective view of an umbrella hub comprising a cord retention device and a cord disposed through the cord retention device, according to one embodiment.

In accordance with various embodiment of the present inventions, there are provided various configurations of a hub that can be used with an umbrella support structure, such as an umbrella or pavilion, to facilitate the rapid and secure deployment of the support structure to an open position and maintaining the support structure in the open position. In some embodiments of the support structure that comprise a cord to control opening and closing of the support structure, the hub can comprise a cord retention device, which restrains movement of the cord so as to maintain the support structure in an open position. As described in greater detail herein, embodiments of the cord retention device can incorporate various features to provide a secure engagement with the cord.

One of the disadvantages of prior art hubs and cord retention devices is that these devices require a multitude of parts and substantial manual labor to assemble the hub and the cord retention device. The devices generally comprise several individual components that must be carefully assembled by hand. As a result, the cost and time required for production of such devices is high.

In contrast, embodiments disclosed herein provide for hubs and cord retention devices that can be easily formed using minimal parts and assembly time. For example, some of the embodiments disclosed herein provide for an umbrella hub with an integrated cord retention device. In such embodiments, the hub can be configured such that components of the cord retention device are injection molded with the hub. Thus, in some embodiments, upper and lower hub portions can be injection molded and assembled together without any additional parts to form a hub with an integrated cord retention device. For example, the hub and the cord retention device can be formed together of a monolithic or continuous single piece of material, such as by injection molding, to form a cord retention hub. In other embodiments, the hub can be injection molded and assembled with minimal additional parts to form a hub with an integrated cord retention device. In any of the embodiments, the manufacturing and assembly time can be shorter than that required by the prior art.

Another disadvantage associated with prior art hubs and cord retention devices is that the cord path in these devices is obstructed. For example, in an umbrella, a first, fixed end of the cord is attached to a lower hub, the cord extends upwardly toward an upper hub and around a pulley member of the upper hub, and back down to the lower hub where a second, free end of the cord can be grasped by a user to open or close the umbrella. In use, the free end of the cord is pulled downwardly to cause the lower hub to rise toward the upper hub to open the umbrella. The free end of the cord can then be attached to or fixed along the umbrella pole or lower hub to maintain tension in the cord to thereby maintain the raised position of the lower hub. However, even though an umbrella may use a device for fixing the free end cord, the travel path of the cord along its free end is obstructed.

An obstructed travel path can be created, for example, when the travel path of the free end of the cord from the upper hub down to the lower hub is non-linear. In particular, the free end of the cord must be forced around an edge or structure of the umbrella (that is not the cord retention device) before reaching the cord retention device. As a result, several problems can occur. First, the rope can become worn and may experience fraying and/or failure due to friction with and contact against the edge or structure of the umbrella. Additionally, such devices can be difficult to operate because the user must not only hold the free end of the cord in tension, but must also force the free end of the cord into the cord retention device after changing direction of the cord. Finally, the obstructed travel path may weaken the connection between the free end of the cord and the cord retention device such that the cord can be easily unintentionally and undesirably dislodged during use.

For example, U.S. Pat. No. 7,293,573, issued to Clarke, illustrates an umbrella pulley system that uses a cam cleat member. The cam cleat member includes a pair of cams that are pivotally mounted to the exteriorly exposed surface of the base portion of the main hub member below the main hub member. In use, a line member of the pulley system is drawn over the main hub member and placed between the pair of cams to prohibit the movement of the line member in either direction. The main hub member will thereby be maintained in a vertical position along the pole member. However, line member is exposed against the outer surface of the main hub member. Thus, the line member is radially misaligned with the cam cleat member. Notably, as the line member extends downwardly, the line member must bend around the perimeter of the main hub member and bend radially inwardly toward the cam cleat member. This exposed and obstructed cord travel path, as described above, can cause disengagement of the line member from the cam cleat member. As a result, unexpected closing of the umbrella can occur. Further, as mentioned above, the drawbacks associated with such a device are numerous and include, inter alia, cord wear, difficulty placing the cord in the cord retention device, and difficultly maintaining placement of the cord in the device during use.

In contrast, various embodiments disclosed herein provide an obstruction-free travel path of the free end of the cord. Thus, cord life can be extended, the engagement of the cord with the cord retention device can be secure, and the user can easily place or mount the cord into the cord retention device. These advantages are obtained through some embodiments due at least in part, to the integral construction of the hub and the cord retention device. In other words, several embodiments provide for a hub that is integrally formed with the cord retention device. Other embodiments may provide for a cord passage that extends through the hub toward the cord retention device. In these embodiments, the travel path of the free end of the cord is configured to reduce and/or eliminates contact between the free end of the cord and an edge or component of the shade structure. In some embodiments, the travel path is configured to eliminate or significantly reduce contact between the free end or a lower length of the cord and any edge or component of the shade structure that is not part of the cord retention device.

In accordance with aspects of at least some of the embodiments disclosed herein, the umbrella hub can provide other significant advantages. For example, because the umbrella hub and the cord retention device can be combined into a single component and, in some cases, formed of very few parts, these embodiments can be more robust, less complex, and have fewer failure modes. In other words, the simplicity of these embodiments provides not only an aesthetic benefit, but the mechanical benefit to use that fewer parts can be damaged through regular use. Additionally, various embodiments disclosed herein provide for an umbrella hub that has no protruding or exposed cord retention components. Thus, the rigors of typical use including bumps, contact with the canopy, and exposure to the elements will generally not affect the operation or otherwise damage the hub and the cord retention device.

Referring now to the drawings wherein the showings are made for purposes of illustrating preferred embodiments of the present inventions and not for purposes of limiting the same, FIG. 1 is a bottom perspective view of an umbrella hub assembly 10 comprising a hub portion 12 and a cord retention device 14. As will be appreciated by those of skill in the art, the hub portion 12 in the illustrated hub assembly 10 of FIGS. 1-3 can be a lower hub portion of the hub assembly 10. In this regard, an upper hub portion can be attached to the hub portion 12 to complete the hub assembly 10. Other embodiments shown and described further herein illustrate upper hub portions. For ease in illustrating and describing this embodiment, the hub portion 12 is shown without the upper hub portion. However, in accordance with this embodiment, as well as other embodiments, an upper hub portion can be used in the hub assembly 10, as described further below.

FIG. 1 illustrates the hub portion 12 with an umbrella cord 16 that is disposed through the cord retention device 14, according to an embodiment of the present inventions. As shown, the cord retention device 14 can be integrally formed with the hub portion 12. For example, the cord retention device 14 and the hub portion 12 can be injection molded as a single, monolithic part. In other words, it is contemplated that in injection mold can be made that allows a single injection of resin to be used to form the hub portion 12 with the cord retention device 14. Thus, in such an embodiment, no additional components would be necessary. In some embodiments, this monolithic component can be combined with an upper hub portion, and any fasteners to fasten the hub portion 12 to the upper hub portion.

In the illustrated embodiment, the hub portion 12 can comprise a central aperture 18 for receiving an umbrella pole or pavilion pole therethrough. The hub portion 12 comprises a hub body 20. The hub body 20 can be formed to include a plurality of engagement sections 22. The engagement sections 22 can be configured to receive a rib of an umbrella or pavilion support structure (not shown). In this regard, the engagement sections 22 can be formed between protrusions 24 of the body 20 of the hub portion 12. Accordingly, as illustrated, in some embodiments the cord retention device 14 can be formed in the body 20 of the hub portion 12. Further, the cord retention device 14 can be formed or disposed in a protrusion 24 of the body 20. In some embodiments, it is contemplated that the protrusion 24 can be configured to allow the cord 16 to past therethrough. Such an embodiment is described and illustrated further below.

Figure 2:
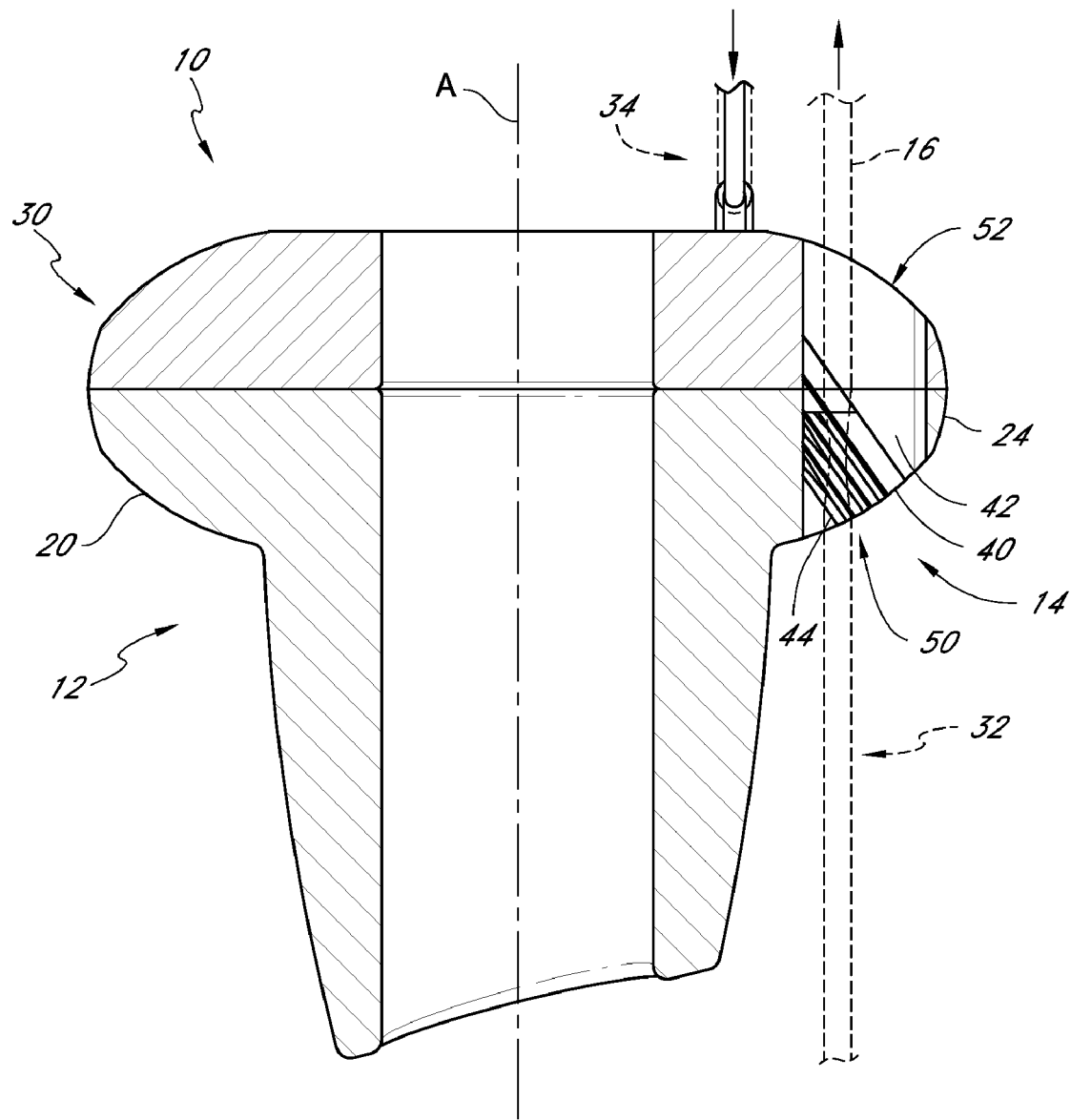
FIG. 2 is a cross-sectional side view of the umbrella hub of FIG. 1 illustrating an embodiment of the cord retention device.

FIG. 2 is a cross-sectional side view of the umbrella hub assembly 10 of FIG. 1 illustrating an embodiment of the cord retention device 14, which is formed in the hub portion 12. In accordance with an embodiment, FIG. 2 also illustrates an upper hub portion 30 that is attached to the hub portion 12. A separate or separable upper hub portion 30 is not required. An umbrella cord 16 is also shown in dashed lines. Further, the umbrella cord 16 defines a free end 32 and a fixed end 34. The fixed end 34 of the cord 16 can be attached to the upper hub portion 30 (or directly to the hub portion 12) in order to facilitate the raising or lowering of the hub assembly 10.

As similarly described above, the hub assembly 10 can be moved by a user up and down in umbrella pole to open or close the umbrella canopy. The cord 16 can be looped around a pulley member attached to an upper hub or upper portion of the umbrella or pavilion structure. Accordingly, if a user desires to open in the umbrella, the user can pull down on the free end 32 of the cord 16, which will cause the fixed end 34 to pull the hub assembly 10 upwardly. However, due to the gravitational force and corresponding weight of the moving umbrella components, the free end 32 of the cord 16 must be fixed at least temporarily to maintain the umbrella structure in an open position. Arrows are used to illustrate the travel direction of the cord 16 due to the gravitational force. Therefore, as described herein, various embodiments, including the embodiment illustrated in FIGS. 1-4, are provided to enable a user to fix the cord 16 relative to the hub assembly 10.

One of the unique advantages of the embodiment illustrated in FIGS. 1-4 is that the cord retention device 14 takes advantage of the upward force transmitted by the cord 16 to secure the cord 16 relative to the assembly 10. In this regard, the cord retention device 14 can be configured as a slot 40 disposed through the body 20 of the hub portion 12. The slot 40 can comprise one or more interior surfaces 42. Additionally, in this embodiment, the interior surfaces 42 can comprise one or more raised portions 44. The raised portions 44 can be configured as elongate ridges. The ridges need not be elongate in all embodiments, but preferably are configured to bite into the cord 16 in opposition to the force transmitted thereby. In one configuration the ridges define a triangular cross-section. For example, the raised portions 44 can be configured to provide a tooth-like engagement with the cord 16 in the slot 40.

In embodiments wherein the raised portions 44 are configured as elongate ridges, the raised portions 44 can extend in a direction that is generally transverse relative to a longitudinal axis A of the hub portion 12. In some embodiments, the raised portions 44 can upwardly extend at an angle relative to the longitudinal axis A of the hub portion 12.

Further, the raised portions 44 can be distributed along the interior surfaces 42 of the slot 40 such that the slot 40 defines an engagement zone 50 and a passage zone 52. The engagement zone 50 can be that area of the slot 40 that is used to engage or retain the cord 16. The passage zone 52 can be that area of the slot 40 that allows the cord 16 to move freely either in and upward or downward direction. In the illustrated embodiment, the engagement zone 50 is located along the left side of the slot 40. In other words, slot 40 of the illustrated embodiment can engage the cord 16 if the cord 16 is drawn radially inwardly towards the longitudinal axis A of the hub portion 12. Further, the cord 16 can be moved freely up or down relative to the hub portion 12, if the cord 16 is moved radially outward into the passage zone 52 away from the longitudinal axis A of the hub portion 12.

Figure 3:
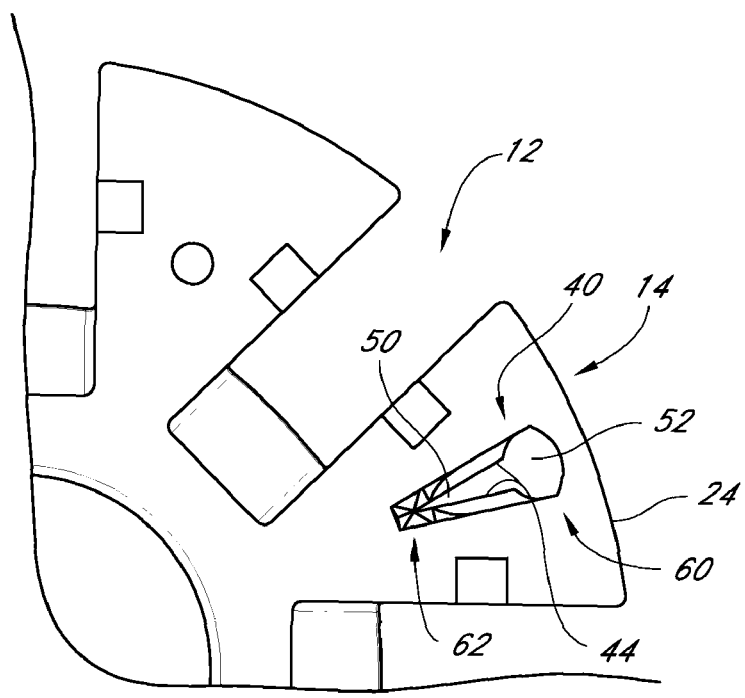
FIG. 3 is a top view of a portion of the umbrella hub of FIG. 1 illustrating a top section of the cord retention device.
Figure 4:
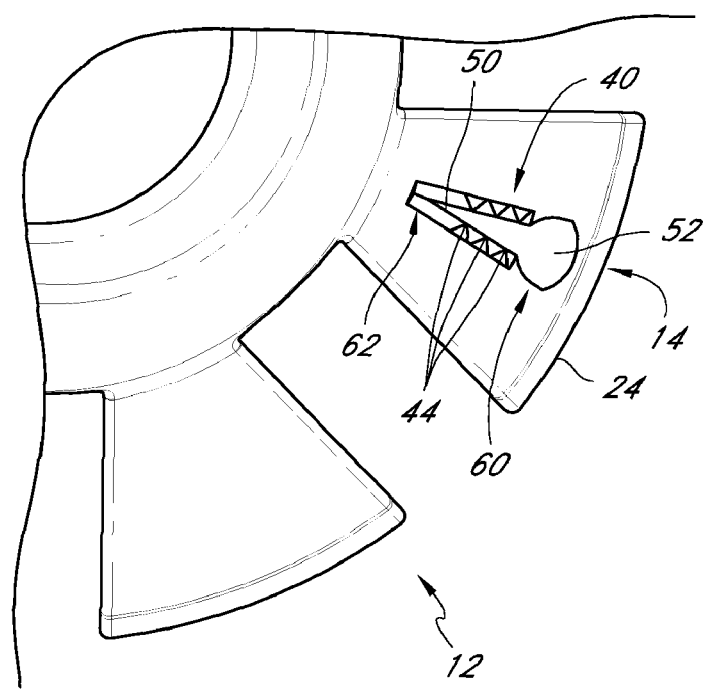
FIG. 4 is a bottom view of a portion of the umbrella hub of FIG. 1 illustrating a bottom section of the cord retention device.

With reference to FIGS. 3 and 4, top and bottom sections of the hub portion 12 are shown to illustrate further details of the construction of the hub portion 12 with the cord retention device 14. These figures illustrate that these slot 40 can comprise a variable width. For example, the slot 40 can comprise a wide section 60 and a narrowed section 62. The wide section 60 can correspond to the passage zone 52 of the slot 40. Accordingly, when the cord 16 is disposed in the wide section 60 of the slot 40, the cord is in the passage zone 52 and can easily be moved up or down relative to the hub portion 12.

One of the unique advantages of embodiment wherein the slot 40 has a variable width is that the shape and orientation of the raised portions 44 and the width of the slot 40 can be configured to facilitate self-locking of the cord 16. Thus, the user can easily raise the hub assembly 10 by pulling down on the cord 16 and then gently urging the cord 16 toward the narrowed section 62 of the slot 40 such that the cord 16 is engaged by the raised portions 44 and the upward force of the cord 16 causes the cord 16 to be drawn into the engagement zone 50 of the slot 40. Therefore, the upward force of the cord 16 will cause the cord 16 to become lodged into the engagement zone 50 of the slot 40. In order to dislodge or disengage the cord 16, the user can pull down and out on the cord 16 such that the cord 16 moves downwardly and radially outward along the diagonal raised protrusions 44 until the cord 16 is in the passage zone 52.

In some embodiments, the raised portions 44 can extend along the interior surfaces 42 of the slot 40 in only the hub portion 12. However, it is contemplated that the raised portions 44 may also extend along the interior surfaces 42 of the slot 40 in both the hub portion 12 and the upper hub portion 30. Further, it is noted that the raised portions 44 can extend in a generally diagonal direction relative to the longitudinal axis A of the hub 12. As illustrated, the raised portions 44 can extend upwardly toward the longitudinal axis A. However, in other embodiments, it is contemplated that the raised portions 44 can extend upwardly away from the longitudinal axis A. In such embodiments, the slot 40 can be configured with the engagement zone 50 being disposed radially outwardly from the passage zone 52. Thus, to engage the cord 16 with the assembly 10, a user would need to pull down on the cord 16 and pull the cord 16 radially outwardly so as to urge the cord 16 toward the engagement zone 50 of the slot 40.

As described above, such an embodiment can provide significant advantages, such as reduced manufacturing and assembly costs. Furthermore, such an embodiment can also provide a discrete yet robust design that is mechanically and aesthetically desirable.

Figure 5:
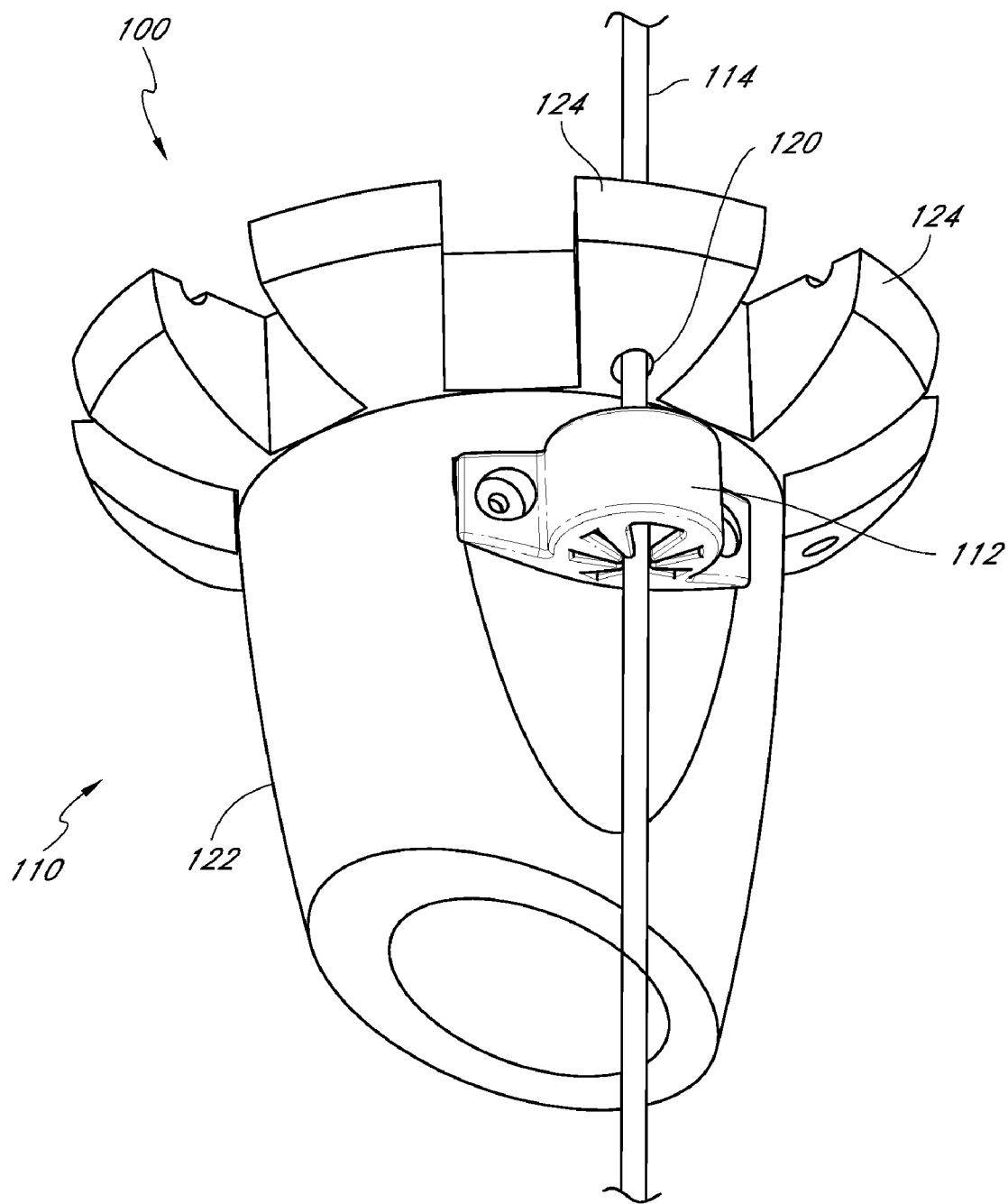
FIG. 5 is a bottom perspective view of an umbrella hub comprising a cord retention device and a cord disposed through the cord retention device, according to another embodiment.

Another embodiment is illustrated by FIG. 5-9. FIG. 5 is a bottom perspective view of an umbrella hub assembly 100 comprising a hub portion 110 and a cord retention device 112. FIG. 5 also illustrates a cord 114 disposed through the cord retention device 112. As described above with regard to the embodiment shown in FIGS. 1-4, the hub assembly 100 can comprise an upper hub portion and a lower hub portion. Further, the hub portion 110 can correspond to the lower hub portion of the assembly 100. Other details and features of the hub assembly 100, such as the engagement of the upper and lower hub portions with ribs of an umbrella support structure can be the same as that described above with regard to FIGS. 1-4. Accordingly, these details will not be reproduced for this embodiment.

FIG. 5 illustrates that the hub portion 110 comprise an aperture 120 extending through a body 122 of the hub portion 110. The aperture 120 can extend through a protrusion 124 of the hub portion 110. In this regard, the aperture 120 can also be formed in an upper hub portion of the assembly 100 such that the cord 114 can pass downwardly through the assembly 100 toward the cord retention device 112.

Figure 6:
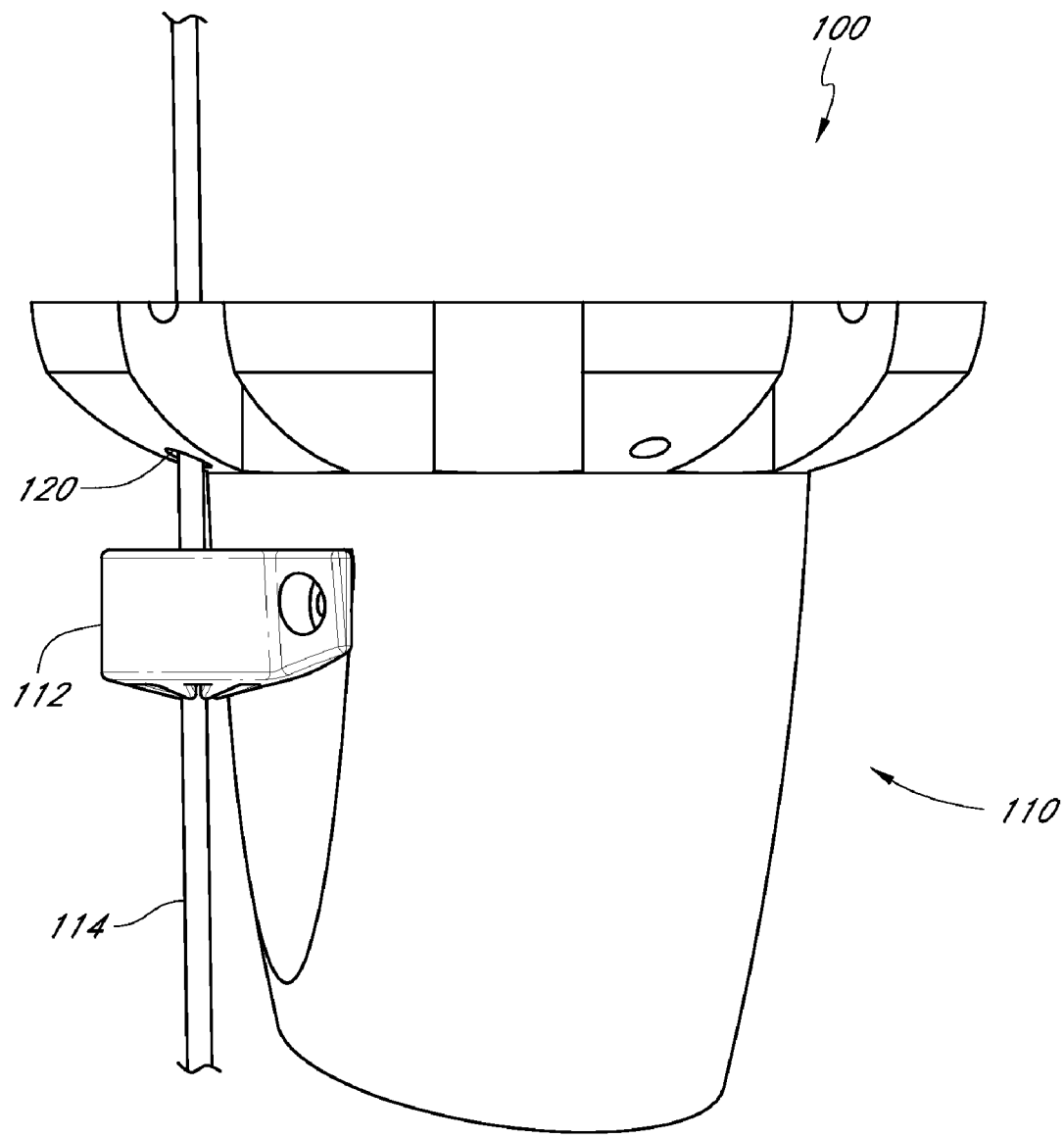
FIG. 6 is a side view of the umbrella hub of FIG. 5 illustrating the cord retention device.
Figure 7:
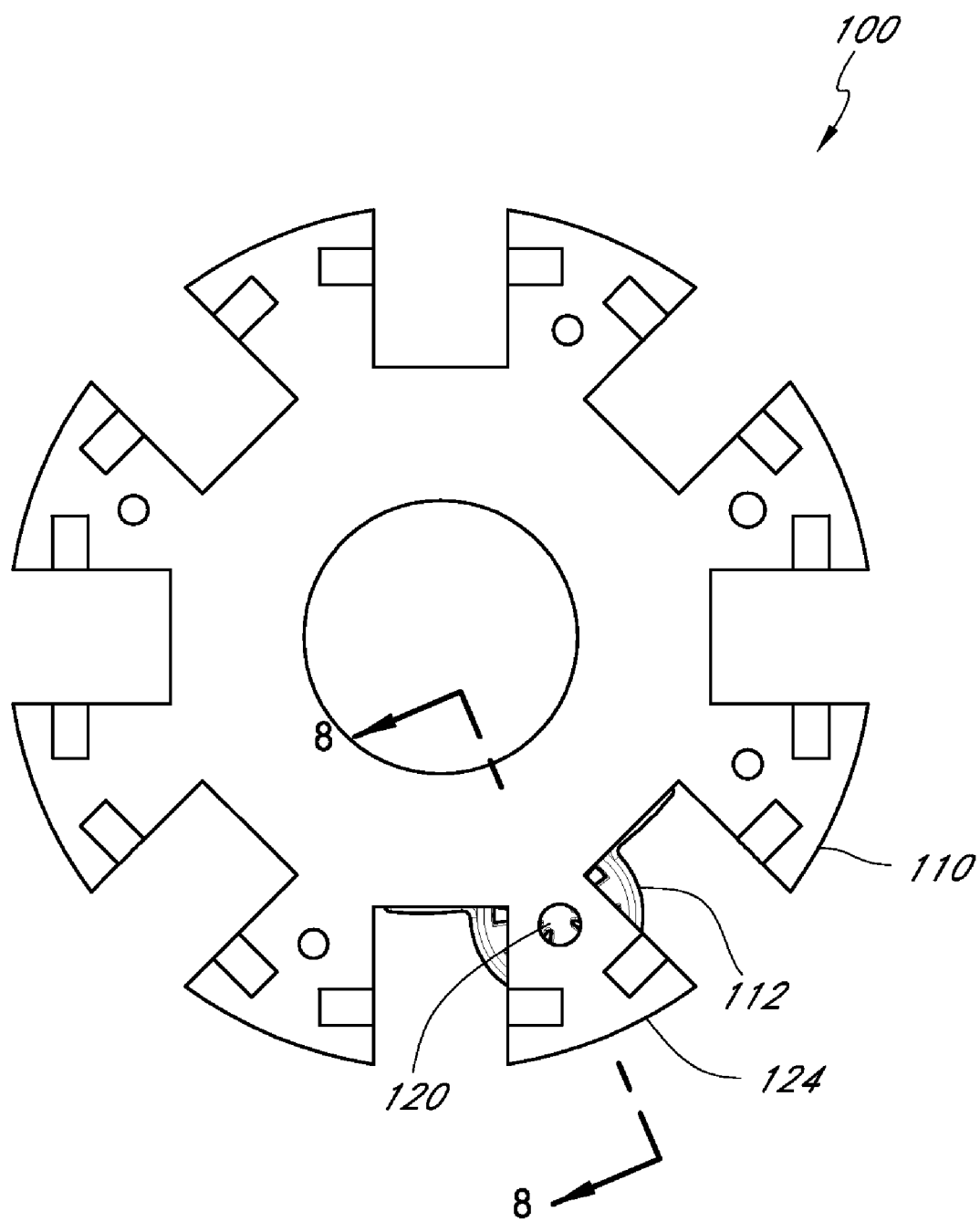
FIG. 7 is a top view of the umbrella hub of FIG. 5 illustrating a through path of the cord through the umbrella hub and the cord retention device.

FIGS. 6-7 illustrate the side and top views of the assembly 100 shown in FIG. 5. Similar to the embodiment discussed above with respect to FIGS. 1-4, the operation of the assembly 100 takes advantage of the upward force of the cord 114 when the assembly 100 has been raised to open the umbrella structure. FIGS. 5 and 6 illustrate that the cord retention device 112 can be coupled with, e.g., attached to, the hub portion 110. In this regard, the cord retention device 112 can be formed as a single component that is fastened to an outer surface of the hub portion 110. Further, the cord retention device 112 can be fastened to the hub portion 110 generally below and aligned with the aperture 120.

Figure 8:
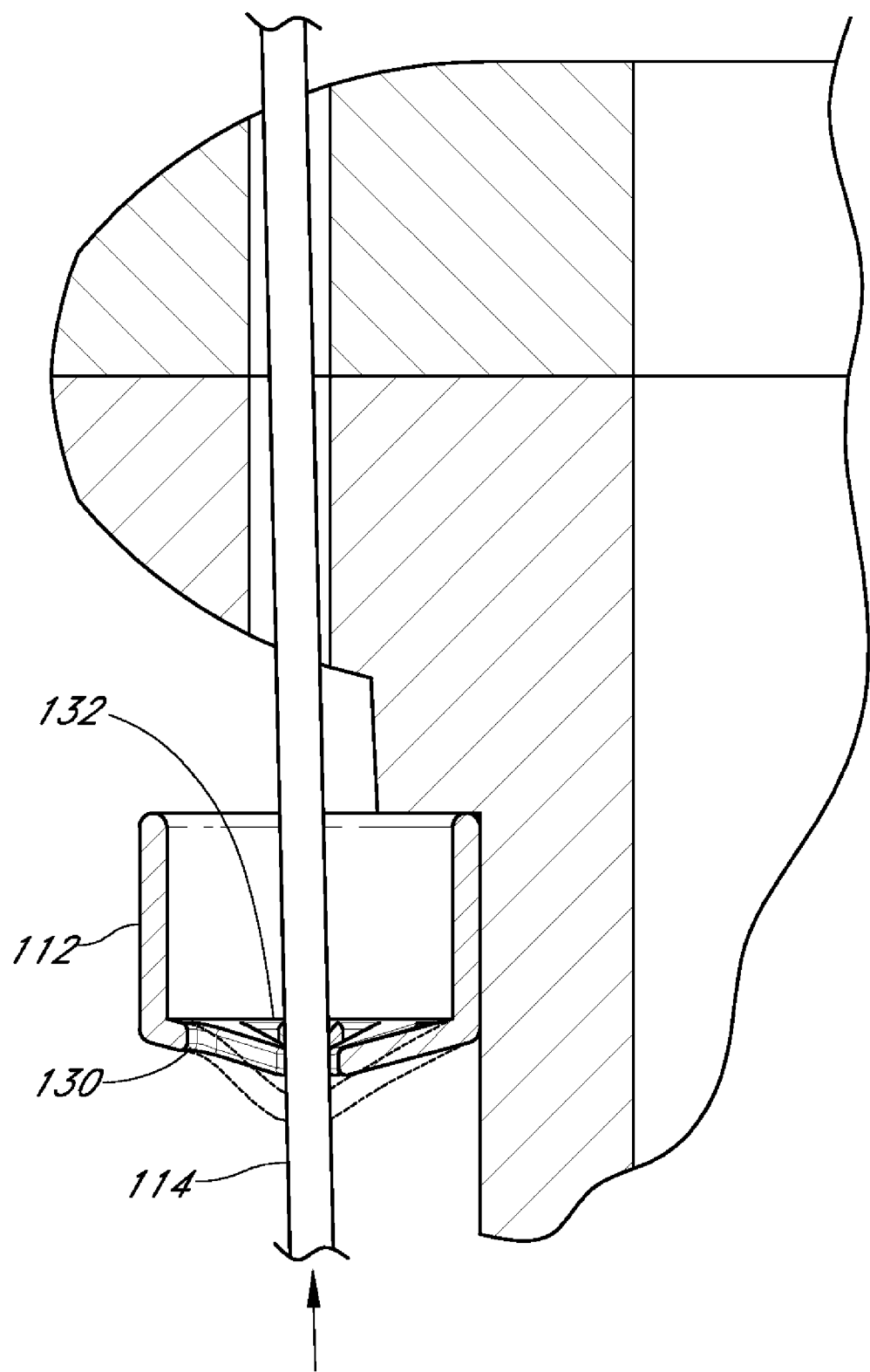
FIG. 8 is a cross-sectional side view of the cord retention device of the umbrella hub of FIG. 5, illustrating a passing position and an engaged position of the cord retention device for allowing passage or restricting movement of the cord through the cord retention device.

FIG. 8 illustrates an operational principle of the cord retention device 112. As shown, the cord retention device 112 can comprise a plurality of teeth 130 that point inwardly with respect to an outer body of the device 112 toward an engagement section 132. In some embodiments, each of the teeth 130 can extend generally radially inwardly towards a center longitudinal axis of the cord retention device 112. As will be described further below with reference to FIGS. 9-10, the teeth 130 can be oriented transversely relative to the center longitudinal axis of the cord retention device 112. In particular, the teeth 130 can be oriented to extend at a downward angle relative to the center longitudinal axis toward the center longitudinal axis. In one embodiment, the teeth 130 extend in a non-horizontal orientation such that a free end thereof is at a lower elevation than a free end thereof. Thus, as the cord 114 is pulled downwardly, the teeth 130 will deflect to allow the cord 114 to pass downwardly through the engagement section 132. However, if the cord 114 moves upwardly, the teeth 130 will engage in the cord 114 and prevent upward movement of the cord 114 through the engagement section 132. In other words, the engagement section 132 of the cord retention device 112 can allow one-way movement of the cord 114. Any suitable angle of orientation of the teeth 130 can be used, such as for example, the teeth 130 can be oriented at approximately a 20°-40° relative to a horizontal plane.

Further, in some embodiments, each of the teeth 130 can be of a sufficient length such that if several or all of the teeth 130 are deflected upwardly, the teeth 130 can converge and/or collapse into each other to prevent any of the teeth 130 from being deflected to point in an upward direction. An arrow is shown to illustrate the upward force of the cord 114. As such, even if the upward force of the cord 114 is great, the teeth 130 will not become inverted such that the cord 114 moves upwardly through the engagement section 132. In this manner, the teeth 130 will undergo compressive stresses as they converge, rather than simple bending stresses, to prevent inversion of the teeth 130. Additionally, it is contemplated that the teeth 130 can define a variable cross-sectional geometry to enhance the interference of the teeth 130 as they converge.

Figure 9:
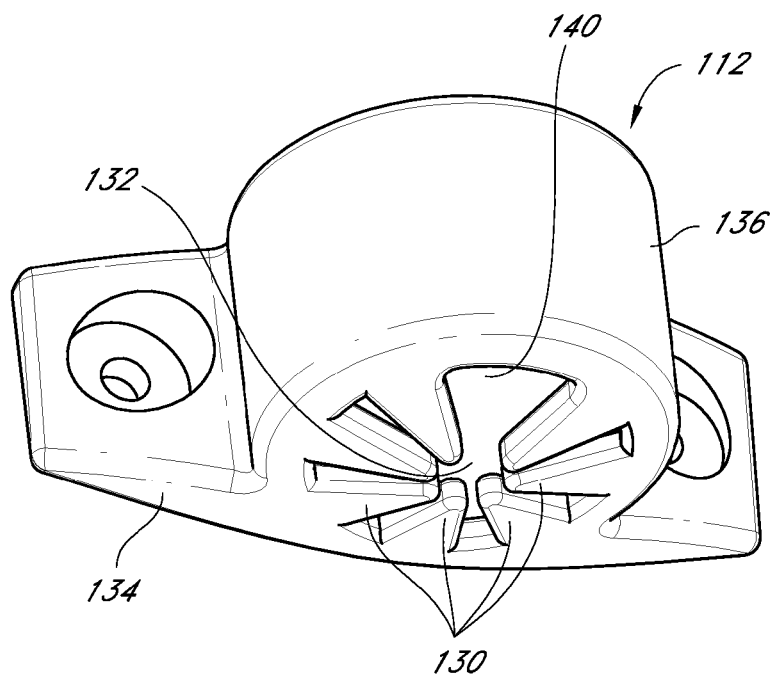
FIG. 9 is a detailed bottom perspective view of the cord retention device of the umbrella hub of FIG. 5.
Figure 10:
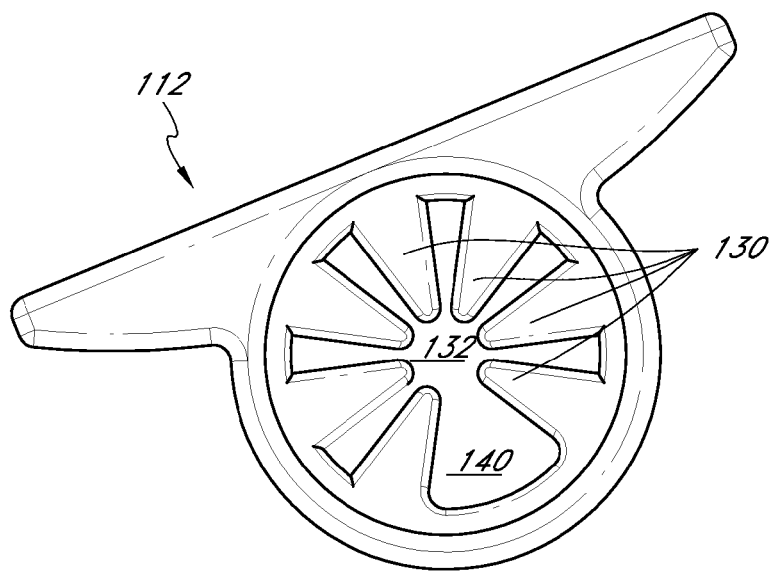
FIG. 10 is a top view of the cord retention device shown in FIG. 9.

FIG. 9 is a bottom perspective view of the cord retention device 112 that can be used with the assembly 100. Further, FIG. 10 is a top view of the cord retention device 112. As shown therein, the cord retention device 112 can comprise a base 134 and a housing 136. The base 134 can be configured to facilitate attachment of the cord retention device 112 to the hub portion 110. Further, the housing 136 can be formed as an annular structure through which the cord 114 can pass. Further, the plurality of teeth 130 extend from the housing 136 and converge inwardly toward the engagement section 132. However, FIGS. 9 and 10 also illustrate that the cord retention device 112 can further comprise a passage section 140. The passage section 140 can be configured to allow the cord 114 to be disposed therethrough for allowing free movement in the upward or downward directions.

Thus, a user can open the umbrella by pulling down on the cord 114 and urging the cord 114 into the engagement section 132 of the cord retention device 112. However, in order to close the umbrella, the user must first pull down on the cord 114, and while pulling the cord 114 down, urge the cord 114 into the passage section 140 of the cord retention device 112.

Figure 11:
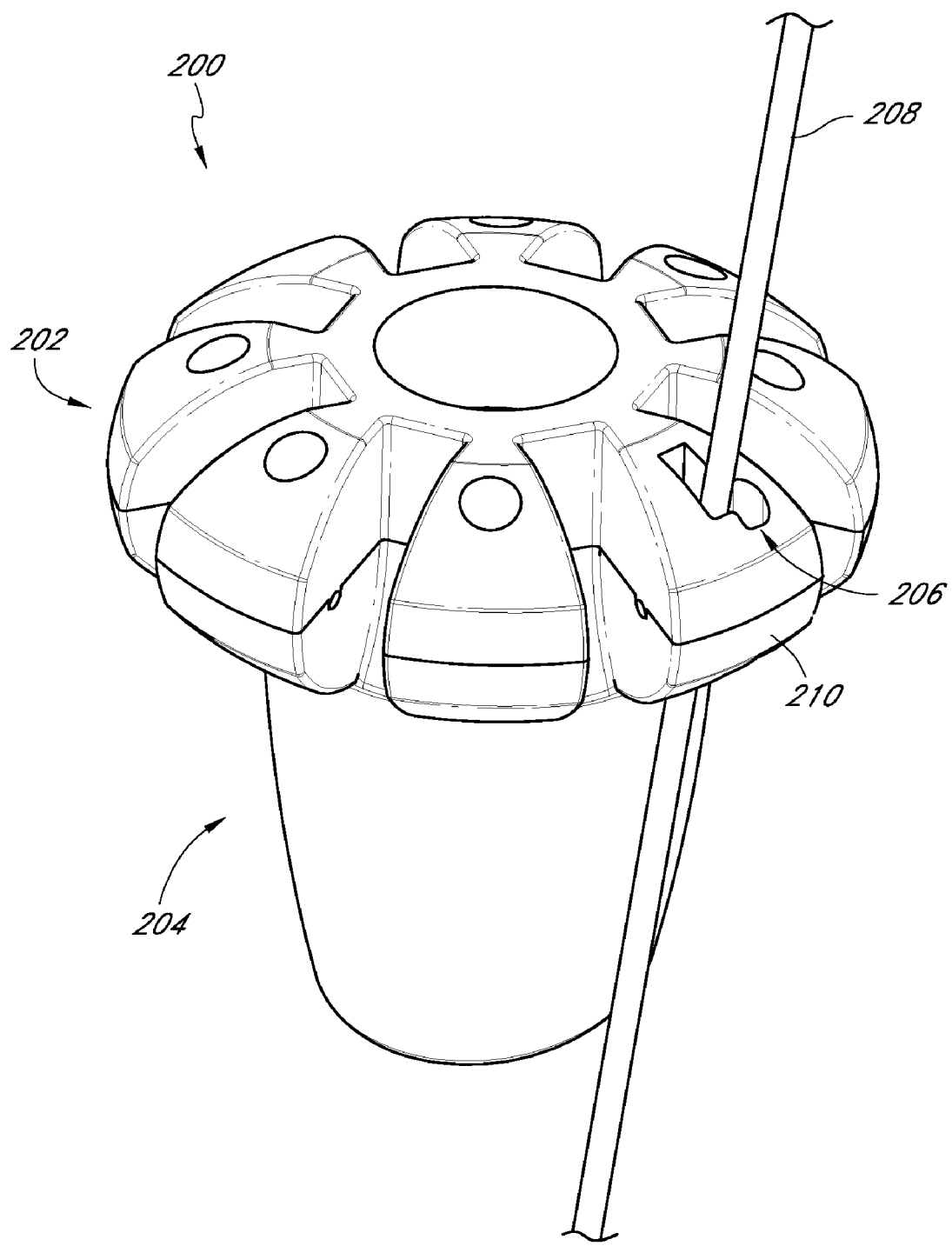
FIG. 11 is a top perspective view of an umbrella hub comprising a cord retention device and a cord disposed through the cord retention device, according to another embodiment.

FIGS. 11-16 illustrate additional embodiments of umbrella hubs and cord retention devices. FIG. 11 is a top perspective view of an umbrella hub assembly 200 comprising an upper hub portion 202, a lower hub portion 204, and a cord retention device 206. The cord retention device 206 is formed in the upper and lower hub portions 202, 204. Further, as illustrated, a cord 208 is disposed through the cord retention device 206. As the embodiments described above, the assembly 200 can be configured such that either or both of the cord retention device 206 or the cord 208 is disposed through a portion of the body of the hub assembly 200. For example, either or both of the cord retention device 206 or the cord 208 can be disposed through a protrusion 210 formed by the upper and lower hub portions 202, 204, as shown in FIG. 11.

Figure 12:
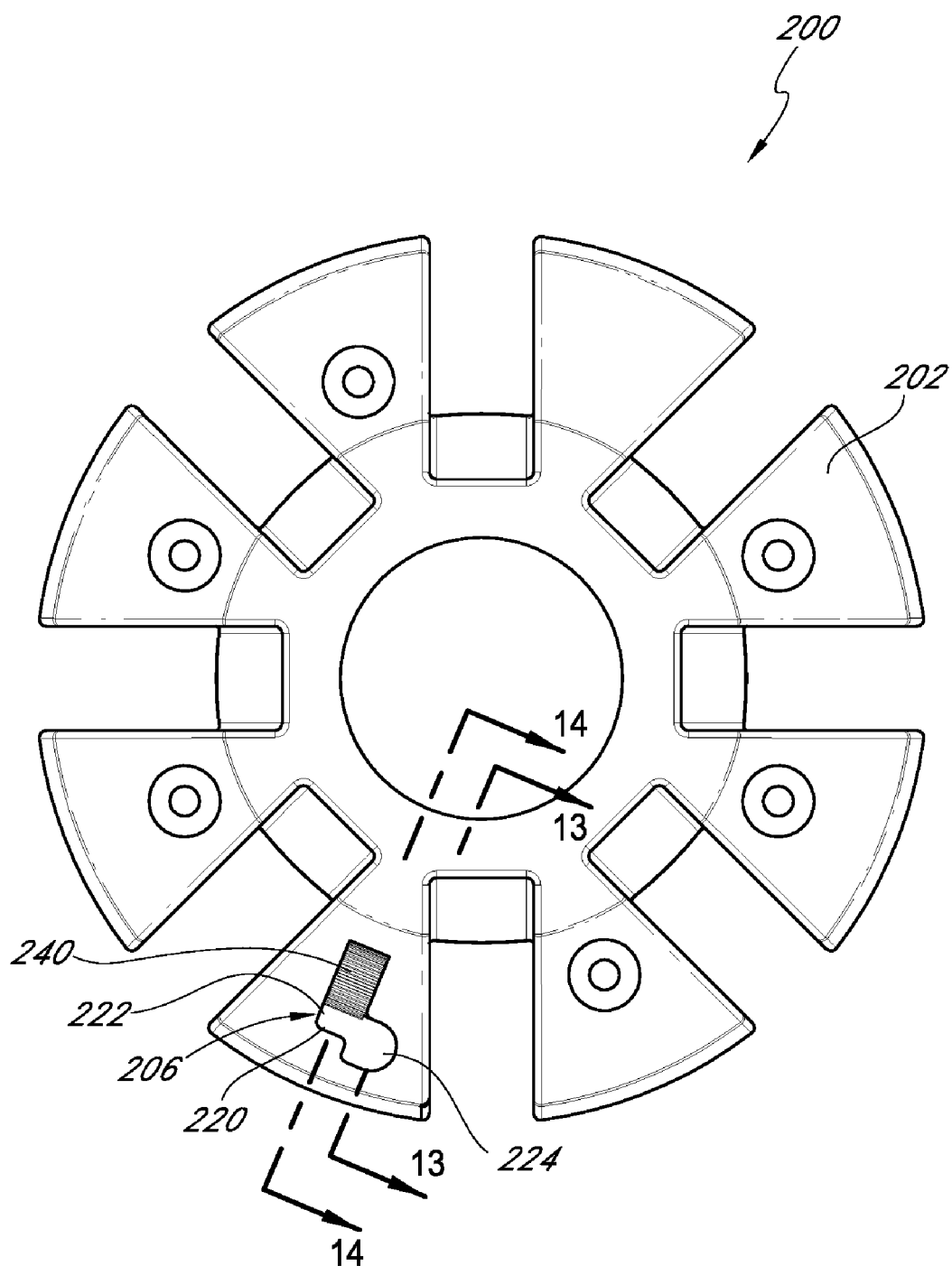
FIG. 12 is a top view of the umbrella hub of FIG. 11 illustrating a through path of the cord through the umbrella hub and the cord retention device.

FIG. 12 is a top view of the umbrella hub assembly 200 of FIG. 11 illustrating a through path of the cord 208 through the umbrella hub assembly 200 and the cord retention device 206. Similar to the embodiments described above, the cord retention device 206 can comprise an aperture 220 that defines a narrow or engagement section 222 and a wide or passage section 224. However, the embodiments illustrated in FIGS. 11-16 can further comprise a rotatable gear member 240. The gear member 240 can be configured to rotate in a single direction to allow the cord 208 to be drawn downwardly through the engagement section 222, but to resist upward movement of the cord 208 through the engagement section 222. Thus, in this embodiment, the cord 208 can pass freely in an upward or downward direction when the cord 208 is positioned in the passage section 224. However, the cord 208 can be restrained by the gear member 240 when positioned in the engagement section 222.

Figure 13:
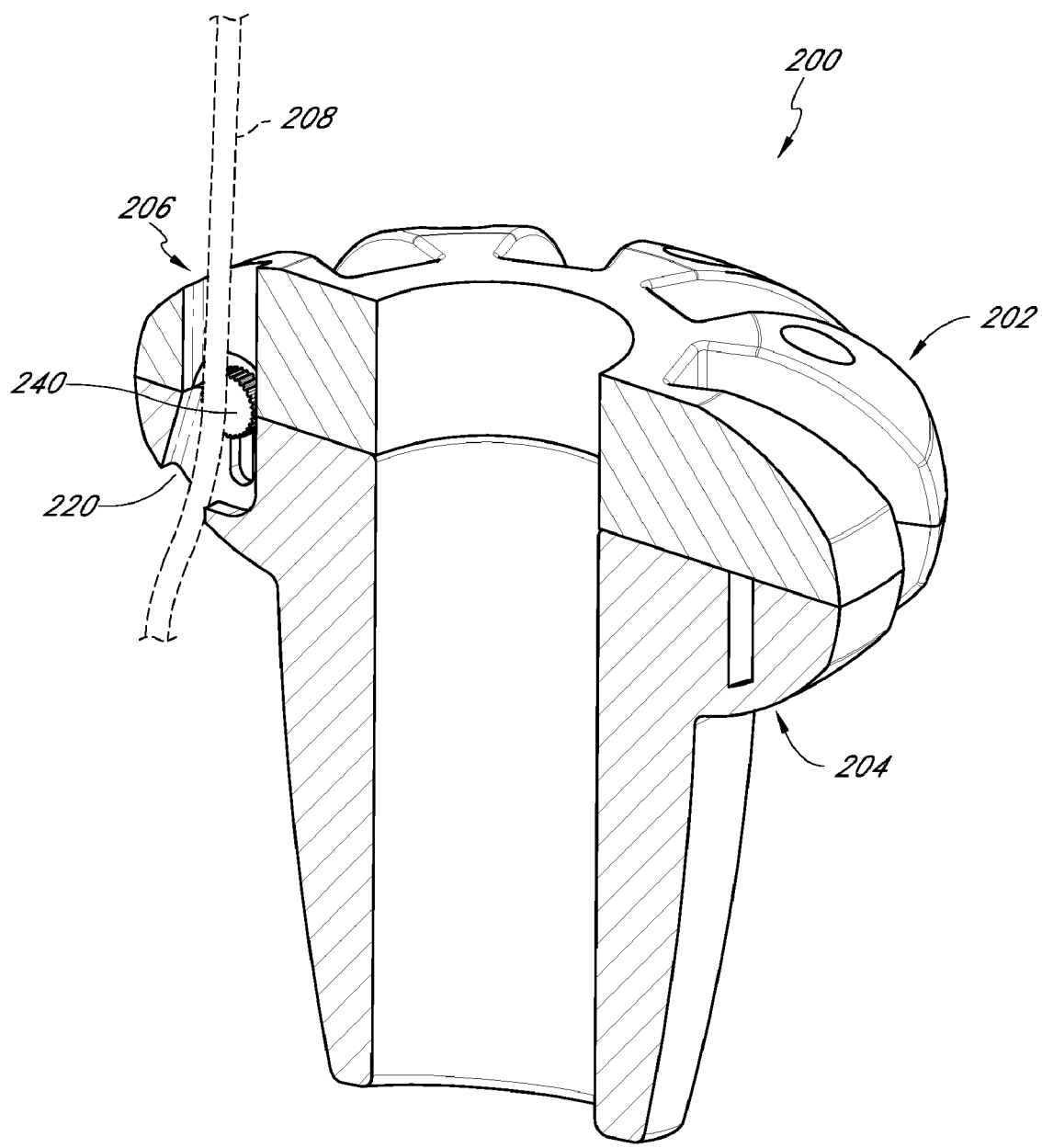
FIG. 13 is a cross-sectional top perspective view of the umbrella hub of FIG. 11 wherein the cord is illustrated in a floating position, according to an embodiment.

In this regard, FIG. 13 is a cross-sectional side view of the umbrella hub 200 of FIG. 11 wherein the cord 208 is illustrated in a floating position in the passage section 224, according to an embodiment. A floating position is one in which the cord 208 can move either in an upward direction or a downward direction without being held by the retention device 206. In one embodiment, the floating position is one in which the cord 208 is disposed on a side of the retention device 206 such that components of the retention device do not engage the cord 208.

Figure 14:
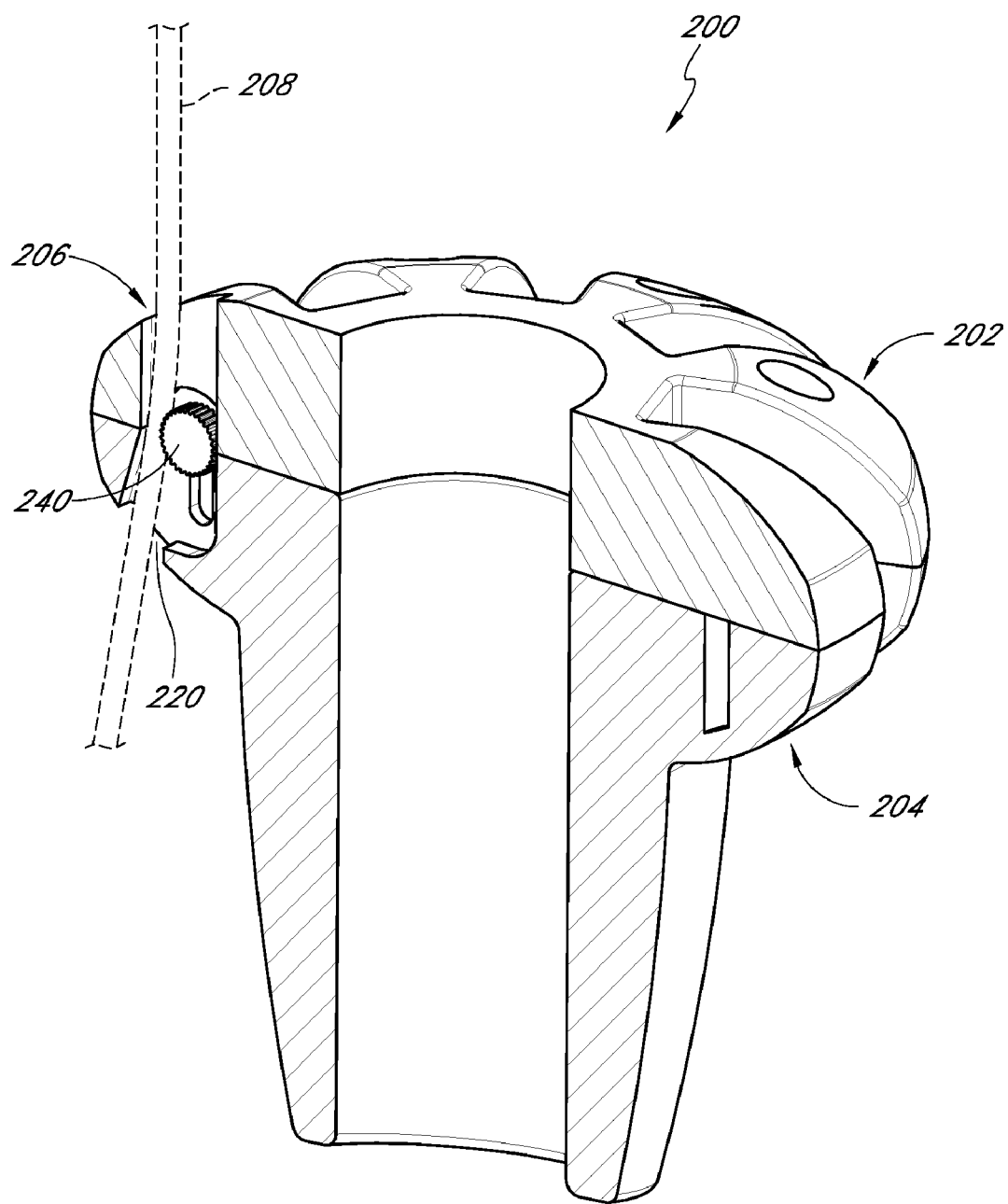
FIG. 14 is a cross-sectional top perspective view of the umbrella hub of FIG. 11 wherein the cord is illustrated in a captured position, according to an embodiment.

FIG. 14 is another cross-sectional side view of the umbrella hub 200 of FIG. 11 wherein the cord 208 is illustrated in a captured position in the engagement section 222, according to an embodiment. In this embodiment, the cord 208 is held between a component of the retention device 206, such as the gear member 240, and the body of the hub 200.

Figure 15:
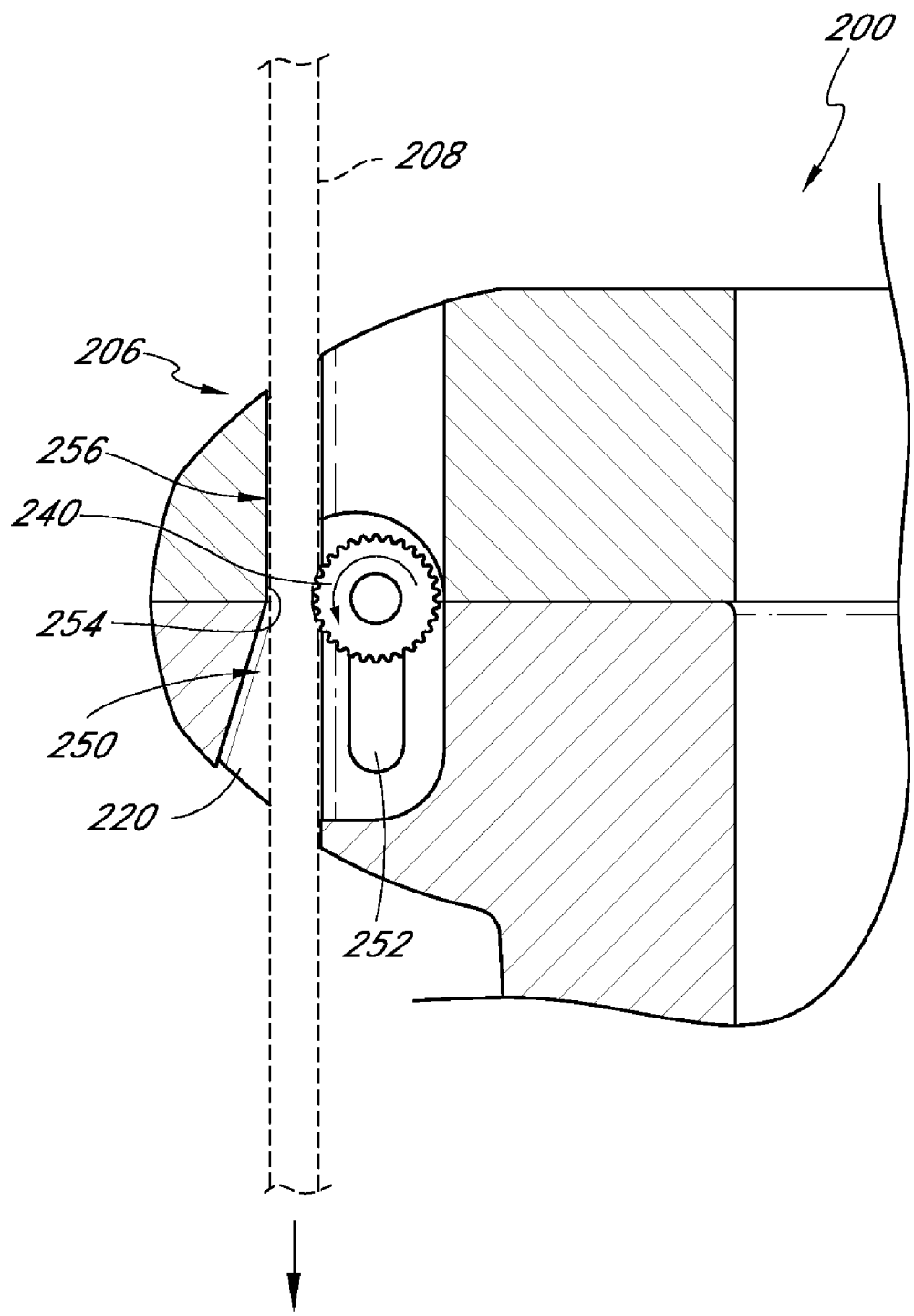
FIG. 15 is a cross-sectional side view of a portion of an umbrella hub including a cord retention mechanism comprising a translatable gear member, according to an embodiment.

FIG. 15 is a cross-sectional side view of the umbrella hub 200 illustrating further features of and the operation of the cord retention device 206, according to an embodiment. As shown therein, the cord 208 is disposed through the engagement section 222 of the aperture 220. In some embodiments, the aperture 220 can be configured to comprise a widened lower section 250. Further, the gear member 240 can be rotatable and translatable relative to the aperture 220.

In such an embodiment, when the cord 208 is pulled downwardly through the engagement section 222, and the gear member 240 will rotate in a counterclockwise direction (specific to the view FIG. 15) and be translated downwardly along a slot 252 formed in the aperture 220. In turn, when the cord 208 moves upwardly through the engagement section 222 of the aperture 220, the gear member 240 will be urged upwardly until it reaches the top of the slot 252 and will then engage the cord 208 to prevent the further upward movement thereof. As the cord 208 is engaged by the gear member 240, the gear member 240 will be drawn upwardly along the slot 252 into a narrow section 256 of the aperture 220 until the cord 208 is engaged or captured between the gear member 240 and an engagement surface 254 of the engagement section 222. Accordingly, the cord 208 can be prevented from further upward movement due to the upward translation of the gear member 240 toward the narrow section 256 of the aperture 220. In some embodiments, the gear member 240 is not translatable and is fixed in elevation at the location shown in FIG. 15.

Figure 16:
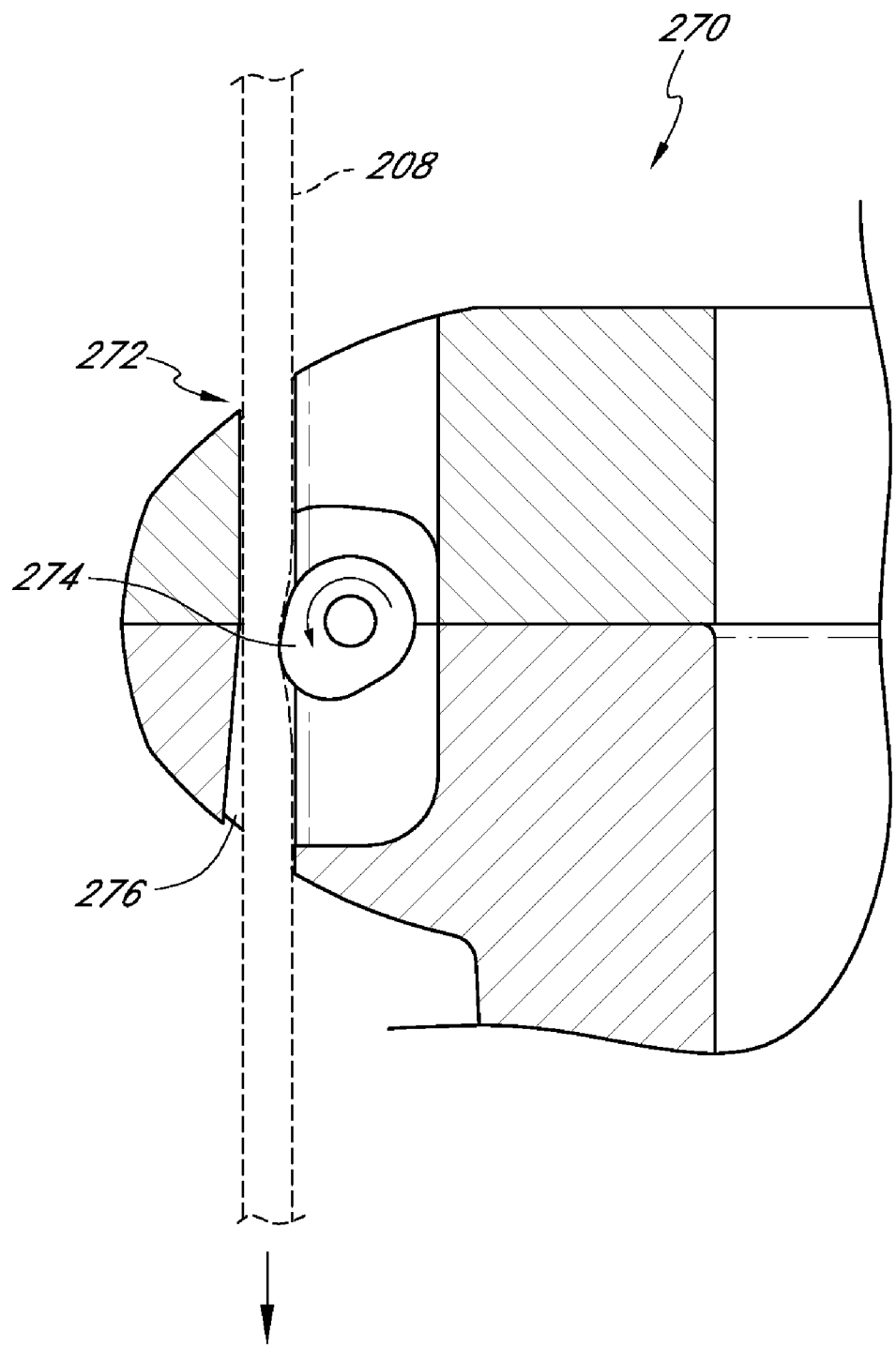
FIG. 16 is a cross-sectional side view of a portion of another umbrella hub including another cord retention mechanism comprising a cam member, according to another embodiment.

FIG. 16 illustrates an additional embodiment of a cord retention device 272 that can be used in an umbrella hub assembly 270 similar to that described above with reference to FIGS. 11-15. The cord retention device 272 includes a rotatable cam member 274. Similar to the embodiment described above with reference to FIGS. 11-15, downward movement of the cord 208 causes the cam member 274 to rotate in a counterclockwise direction, thus allowing the cord 208 to move freely in a downward direction. However, when the cord 208 moves in an upward direction, the cam member 274 rotates in a clockwise direction such that the cam member 274 engages the cord 208 to prevent further upward movement of the cord 208 relative to the assembly 270.

In the above embodiments using a gear member 240 or a cam member 274, the external surface of these members 240, 274 can comprise a friction enhancing coating or surface structure, such as one or more protrusions or teeth, in order to facilitate engagement with the cord. In accordance with yet other embodiments, the present inventions can also comprise one or more umbrellas comprising any of the hubs.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An umbrella hub comprising:
   a hub body comprising a series of projections extending outwardly from the hub body;
   a channel formed in one of the projections of the hub body, the channel being configured to allow a cord to pass therethrough; and
   a passage section and an engagement section, the passage section configured to allow the cord to pass freely therethrough, the engagement section being configured to engage the cord to prevent upward movement of the cord relative to the hub body; wherein the channel comprises a rotatable gear member for engaging the cord to allow downward movement of the cord relative to the hub and to prevent upward movement of the cord relative to the hub.

2. The umbrella hub of claim 1, wherein the passage section and the engagement section are disposed in the channel.

3. The umbrella hub of claim 1, wherein the channel comprises a plurality of raised protrusions for engaging the cord.

4. The umbrella hub of claim 1, wherein the engagement section comprising a first vertical section of the channel that is spaced radially from the radial surface of the rotatable member such that the cord is disposed in the first vertical section when contacting the radial surface, the passage section comprising a second vertical section of the channel that is separated from and spaced laterally from the first vertical section and the radial surface of the rotatable member.

5. An umbrella hub comprising:
a central portion configured to receive to an umbrella pole;
a body extending between the central portion and an outer periphery of the hub, the body comprising a top surface, a bottom surface and an engagement section adjacent to the outer periphery, the engagement section being configured to receive an end portion of an umbrella structural member; and
a cord retention device formed in the body of the hub, the cord retention device comprising a channel extending through the body from the top surface thereof to the bottom surface thereof, the channel having a first section and a second section, the first section configured such that when a cord extends therethrough, the cord can move freely in both a first direction from the top surface toward the bottom surface and a second direction from the bottom surface toward the top surface, the second section configured such that when the cord extends therethrough, the cord can move freely in the first direction while being constrained from movement in the second direction, the cord retention device thereby allowing the cord to be selectively pulled through the channel to a selected position relative to the hub and retained at the selected position.

6. The umbrella hub of claim 5, wherein the second section of the channel comprises a slot having a narrow portion and a wide portion.

7. The umbrella hub of claim 6, wherein the narrow portion of the slot extends transversely relative to a longitudinal axis of the umbrella hub.

8. The umbrella hub of claim 6, wherein the narrow portion of the slot comprises one or more ridges.

9. The umbrella hub of claim 5, wherein the channel is enclosed by an engagement surface.

10. The umbrella hub of claim 5, wherein the cord retention device is monolithically formed with the body of the hub.

11. The umbrella hub of claim 5, wherein the cord retention device is formed in the body radially intermediate the central portion and the engagement section.

12. The umbrella hub of claim 5, wherein the cord retention device comprises a rotatable member extending into the channel, the rotatable member configured to rotate in a first rotational direction in order to allow the cord to move in the first direction, but to engage the cord to prevent movement of the cord in the second direction.

13. The umbrella hub of claim 12, wherein the rotatable member comprises one or more teeth.

14. The umbrella hub of claim 12, wherein the rotatable number is cylindrically shaped.

15. The umbrella hub of claim 12, wherein the rotatable member is a cam.

16. The umbrella hub of claim 5, wherein the channel of the cord retention device extends generally parallel to a longitudinal axis of the central portion of the hub.

17. The umbrella hub of claim 5, wherein the first section and the second section extend generally parallel relative to each other and relative to a longitudinal axis of the central portion of the hub.

18. The umbrella hub of claim 5, wherein the umbrella hub comprises a rotatable member disposed in the hub body and extending at least partially into the channel formed in a first projection of the hub body, the rotatable member defining a radial surface configured to contact the cord when disposed thereagainst, the first section of the channel being spaced radially from the radial surface of the rotatable member such that the cord is disposed in the first vertical section when contacting the radial surface, the second section of the channel being separated from and spaced laterally from the first vertical section and the radial surface of the rotatable member.

19. An umbrella comprising:
an umbrella pole;
a first umbrella hub comprising a central portion configured to receive the umbrella pole;
a cord connected to the first umbrella hub;
a second umbrella hub comprising a central portion configured to receive the umbrella pole, a body extending between the central portion and an outer periphery of the hub, the body comprising a top surface, a bottom surface, and an engagement section adjacent to the outer periphery, and a cord retention device on the body of the second umbrella hub and comprising a channel that extends through the body of the second umbrella hub from the top surface to the bottom surface thereof;
wherein the cord can move freely through the channel of the cord retention device in a first direction while being restrained from movement in a second direction, the cord retention device thereby allowing the cord to be pulled through the channel to a selected position relative to the second umbrella hub and retained at the selected position for preventing movement of the first umbrella hub relative to the second umbrella hub.

20. The umbrella of claim 19, wherein the channel of the cord retention device comprises a first section and a second section, the second section comprising a slot having a narrow portion and a wide portion, the narrow portion configured to restrain movement of the cord in the second direction.

21. The umbrella of claim 20, wherein the narrow portion of the slot extends transversely relative to a longitudinal axis of the umbrella hub.

22. The umbrella hub of claim 20, wherein the narrow portion of the slot comprises one or more ridges.

23. The umbrella hub of claim 19, wherein the channel is enclosed by an engagement surface.

24. The umbrella hub of claim 19, wherein the cord retention device comprises a rotatable member extending into the channel, the rotatable member configured to rotate in a first rotational direction in order to allow the cord to move in the first direction, but to engage the cord to prevent movement of the cord in the second direction.

25. The umbrella hub of claim 24, wherein the rotatable member is a cylindrical wheel comprising one or more teeth.

26. The umbrella hub of claim 19, wherein the channel comprises a first section and a second section extending generally parallel relative to each other and relative to the longitudinal axis of the central portion of the hub.

27. The umbrella hub of claim 19, wherein the cord retention device comprises a rotatable member disposed in the body of the second hub and extending at least partially into the channel formed in a first projection of the hub body, the rotatable member defining a radial surface configured to contact the cord when disposed thereagainst, the channel comprising first and second vertical sections, the first vertical section being spaced radially from the radial surface of the rotatable member such that the cord is disposed in the first vertical section when contacting the radial surface, the second vertical section being separated from and spaced laterally from the first vertical section and the radial surface of the rotatable member, the second vertical section configured to allow the cord to pass freely therethrough, the first vertical section being configured to engage the cord to prevent upward movement of the cord relative to the hub body.

28. An umbrella hub comprising:
a hub body comprising a series of projections extending outwardly from the hub body;
a channel formed in a first projection of the hub body, the channel being configured to allow a cord to pass therethrough; and
a rotatable member disposed in the hub body and extending at least partially into the channel formed in the first projection of the hub body, the rotatable member defining a radial surface configured to contact the cord when disposed thereagainst,
wherein the channel comprise first and second vertical sections, the first vertical section being spaced radially from the radial surface of the rotatable member such that the cord is disposed in the first vertical section when contacting the radial surface, the second vertical section being separated from and spaced laterally from the first vertical section and the radial surface of the rotatable member, the second vertical section configured to allow the cord to pass freely therethrough, the first vertical section being configured to engage the cord to prevent upward movement of the cord relative to the hub body.

29. The umbrella hub of claim 28, wherein the rotatable member comprises one or more teeth extending from the radial surface thereof.

30. The umbrella hub of claim 28, wherein the rotatable number is cylindrically shaped.

31. The umbrella hub of claim 28, wherein the channel extends generally parallel to a longitudinal axis of the hub.

* * * * *

UNITED STATES PATENT AND TRADEMARK OFFICE
CERTIFICATE OF CORRECTION

| | | |
|---|---|---|
| PATENT NO. | : 7,861,734 B2 | Page 1 of 1 |
| APPLICATION NO. | : 12/353128 | |
| DATED | : January 4, 2011 | |
| INVENTOR(S) | : Oliver Joen-an Ma | |

It is certified that error appears in the above-identified patent and that said Letters Patent is hereby corrected as shown below:

At Column 12, Line 61, in Claim 4, please change "comprising" to --comprises--.

At Column 14, Line 35, in Claim 22, after "umbrella," delete "hub".

At Column 14, Line 37, in Claim 23, after "umbrella," delete "hub".

At Column 14, Line 39, in Claim 24, after "umbrella," delete "hub".

At Column 14, Line 46, in Claim 25, after "umbrella," delete "hub".

At Column 14, Line 48, in Claim 26, after "umbrella," delete "hub".

At Column 14, Line 52, in Claim 27, after "umbrella," delete "hub".

Signed and Sealed this
Sixteenth Day of August, 2011

David J. Kappos
*Director of the United States Patent and Trademark Office*